No. 718,915. PATENTED JAN. 20, 1903.
G. W. COOPER.
HORSE RECEPTACLE.
APPLICATION FILED AUG. 5, 1901.
NO MODEL.
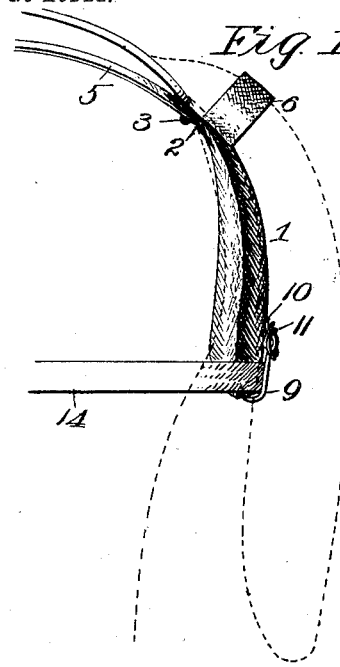
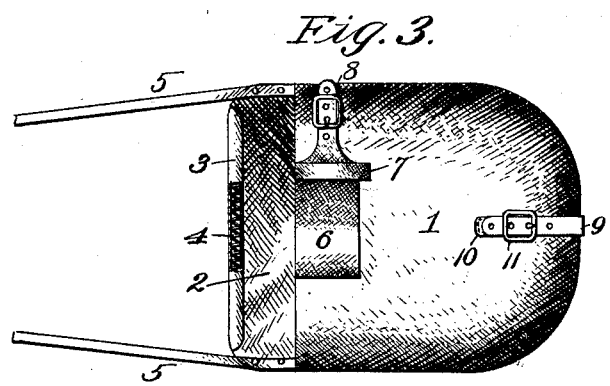
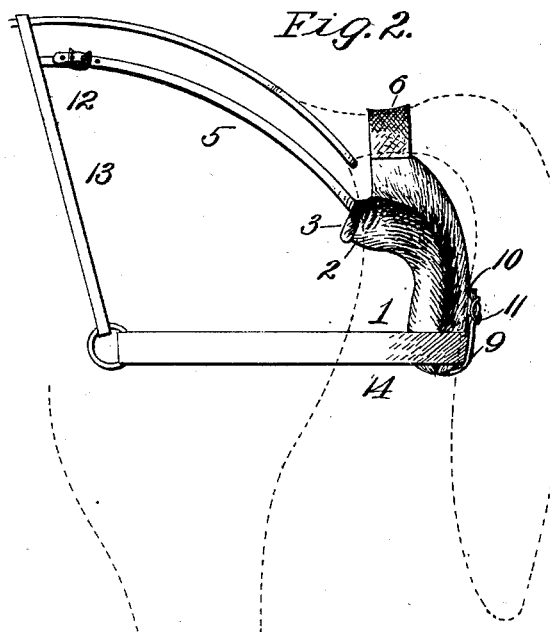
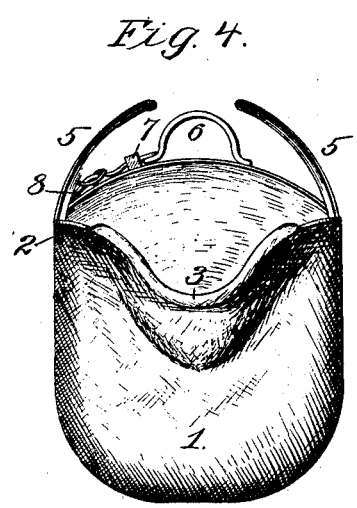
Witnesses:
Arthur McArthur
H. C. Rodgers.
Inventor:
George W. Cooper.
By Fischer & Thorpe
Attys.
THE NORRIS PETERS CO., PHOTO-LITHO., WASHINGTON, D. C.

UNITED STATES PATENT OFFICE.

GEORGE W. COOPER, OF KANSAS CITY, MISSOURI.

HORSE-RECEPTACLE.

SPECIFICATION forming part of Letters Patent No. 718,915, dated January 20, 1903.

Application filed August 5, 1901. Serial No. 70,837. (No model.)

*To all whom it may concern:*

Be it known that I, GEORGE W. COOPER, a citizen of the United States, residing at Kansas City, in the county of Jackson and State of Missouri, have invented certain new and useful Improvements in Horse-Receptacles, of which the following is a specification.

My invention relates to a manure-pouch; and my object is to produce a device of this character which hangs in an inconspicuous position from and is widely opened by the elevation of the tail and receives all of the droppings subsequently ejected.

A further object is to provide a device of this character which is of simple and cheap construction, which can be easily and quickly secured in or removed from position, and which is not uncomfortable or irritating to the animal.

To these ends the invention consists in certain novel and peculiar features of construction and arrangement of parts, as hereinafter described and claimed, and in order that it may be fully understood reference is to be had to the accompanying drawings, in which—

Figure 1 represents the pouch as viewed from the side of an animal equipped with the same. Fig. 2 is a similar view with the pouch occupying a different position. Fig. 3 is a view of the upper or rear side of the pouch. Fig. 4 is a front view of the pouch as occupying approximately the position shown in Fig. 2.

In the said drawings, 1 designates a pouch, of rubber, canvas, leather, or other suitable material, having its front or under side continued beyond the rear or upper side to form an extension 2, and said extension is formed with a marginal loop 3, wherein is confined a coil-spring 4, and is provided at opposite ends of said loop with straps 5. Centrally of the rear or upper side and at the free margin is a loop 6, consisting of a wide strap secured at one end to the sack and passing under a keeper 7 and engaged with a buckle-strap 8, the keeper and buckle-strap being permanently attached to the sack in any suitable manner. A second loop consists of a pair of short straps 9 and 10, attached to the sack near its lower end, one strap having a buckle 11 for engagement with the other.

To secure this pouch in operative position, it is fitted between the body and tail of the horse close to the crupper, and the loop is formed and drawn tightly over the tail by slipping strap 6 through the keeper 7 and engaging it with buckle 8. The straps 5 are brought forward over the rump and attached to straps 12 of the hip-straps 13 or a belly-band (not shown) in case the horse is unharnessed and stabled, this connection being the main support and preventing slippage of the loop on the tail. The lower end of the pouch is tucked between the animal's body and the breech-strap 14, and the latter is looped to the former by buckling straps 9 and 10 together.

In Fig. 1 will be seen the normal position of the pouch, and in Fig. 2 its position when the dropping action takes place. As the tail of the animal is lifted preparatory to the dropping action the mouth of the pouch is distended, the rear or upper side bending upwardly, as shown in Figs. 2 and 4, and the front or lower side buckling downward and forward between the animal's legs, this action being positive and reliable, because the spring is compressed longitudinally by the lateral contraction of the receptacle and is perfectly free to bend only in one direction—viz., downward and forward. The breech-strap 14, extending through the loop at the lower end of the pouch, prevents the latter flapping up and down when the animal is traveling and also tends to render it inconspicuous by confining it between the body and tail of the animal.

From the above description it will be apparent that I have produced a pouch of the character described which performs its function efficiently and which is obviously susceptible of modification in some particulars and in its mode of attachment to the animal without departing from the spirit and scope or sacrificing any of the advantages of the invention.

Having thus described the invention, what I claim as new, and desire to secure by Letters Patent, is—

A manure-pouch having its front or lower portion projecting forwardly beyond the corresponding edge of the upper portion, and provided with a coil-spring 4; said pouch being also provided at its upper side with a keeper 7, with a strap 6 to extend through said keeper, and a buckle-strap 8 for engagement with strap 6, and provided also at its rear and lower end with straps 9 and 10 and a buckle 11 to unite said straps together.

In testimony whereof I affix my signature in the presence of two witnesses.

GEORGE W. COOPER.

Witnesses:
 H. C. RODGERS,
 G. Y. THORPE.